United States Patent
Agarwal et al.

(10) Patent No.: US 10,991,026 B2
(45) Date of Patent: Apr. 27, 2021

(54) PRODUCT RECOMMENDATIONS BASED ON ITEMS FREQUENTLY BOUGHT TOGETHER

(71) Applicant: Home Depot Product Authority, LLC, Atlanta, GA (US)

(72) Inventors: Shubham Agarwal, Atlanta, GA (US); Huiming Qu, Atlanta, GA (US); Shawn Coombs, Smyrna, GA (US); Estelle Afshar, Atlanta, GA (US); Rini Devnath, Atlanta, GA (US); Ramesh Gundeti, Smyrna, GA (US); Prat Vemana, Marietta, GA (US); Kevin Hofmann, Marietta, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 554 days.

(21) Appl. No.: 15/233,804

(22) Filed: Aug. 10, 2016

(65) Prior Publication Data
US 2018/0047083 A1    Feb. 15, 2018

(51) Int. Cl.
*G06Q 30/00*   (2012.01)
*G06Q 30/06*   (2012.01)

(52) U.S. Cl.
CPC ....... *G06Q 30/0631* (2013.01); *G06Q 30/012* (2013.01); *G06Q 30/0641* (2013.01)

(58) Field of Classification Search
CPC ............................................. G06Q 30/0631
See application file for complete search history.

(56) References Cited

U.S. PATENT DOCUMENTS

| | | |
|---|---|---|
| 7,680,703 B1 | 3/2010 | Smith |
| 7,801,843 B2 | 9/2010 | Kumar et al. |
| 7,899,710 B1 | 3/2011 | Walker et al. |
| 7,949,573 B1 | 5/2011 | Cohen et al. |
| 8,250,012 B1 | 8/2012 | Whitman et al. |
| 8,266,014 B1 | 9/2012 | Bhosie et al. |

(Continued)

FOREIGN PATENT DOCUMENTS

CA    2 971 661 A1    12/2017

OTHER PUBLICATIONS

Huang, Wen-Hsien, George C. Shen, and Che-Ling Liang. "The effect of threshold free shipping policies on online shoppers' willingness to pay for shipping." Journal of Retailing and Consumer Services 48 (2019): 105-112.*

(Continued)

*Primary Examiner* — Kathleen Palavecino
(74) *Attorney, Agent, or Firm* — Greenberg Traurig, LLP

(57) ABSTRACT

This disclosure includes systems and methods for providing purchase recommendations to a user that may include items frequently purchased with a product selected by the user. The determination of which items are frequently purchased with which other items may account for both online and in-store transactions and may further account for both pair-wise and multi-wise relationships. The recommendations may be provided on an electronic user interface, such as a website, in response to the user's selection of the product through the electronic user interface. The recommendations may be tailored to the user's selected product so that the recommended items are available in the same delivery channel as the user-selected product.

20 Claims, 9 Drawing Sheets

(56) References Cited

U.S. PATENT DOCUMENTS

| | | | |
|---|---|---|---|
| 8,290,818 B1 | 10/2012 | Levitan et al. | |
| 8,326,690 B2 * | 12/2012 | Dicker | G06Q 30/02 705/14.54 |
| 8,355,955 B1 | 1/2013 | Mirchandani et al. | |
| 8,386,336 B1 | 2/2013 | Fox et al. | |
| 8,412,718 B1 | 4/2013 | Bilger | |
| 8,438,052 B1 | 5/2013 | Chanda et al. | |
| 8,781,917 B2 | 7/2014 | Westphal et al. | |
| 9,202,246 B1 | 12/2015 | Bundy et al. | |
| 9,443,262 B1 | 9/2016 | Mamgain et al. | |
| 9,569,419 B1 | 2/2017 | Rice | |
| 9,727,616 B2 | 8/2017 | Wu et al. | |
| 9,779,442 B1 | 10/2017 | Cimic et al. | |
| 10,198,749 B1 * | 2/2019 | Haskin | G06Q 30/0265 |
| 2003/0160770 A1 | 8/2003 | Zimmerman | |
| 2006/0036510 A1 | 2/2006 | Westphal et al. | |
| 2009/0182642 A1 | 7/2009 | Sundaresan | |
| 2010/0268661 A1 | 10/2010 | Levy et al. | |
| 2011/0099061 A1 | 4/2011 | Giffin et al. | |
| 2011/0302167 A1 | 12/2011 | Vailaya et al. | |
| 2012/0197751 A1 | 6/2012 | Zatkin et al. | |
| 2012/0316960 A1 | 12/2012 | Yang | |
| 2014/0019244 A1 * | 1/2014 | Gundapaneni | G06Q 30/0222 705/14.54 |
| 2014/0052580 A1 | 2/2014 | Ali et al. | |
| 2014/0258016 A1 | 9/2014 | Hale et al. | |
| 2014/0279208 A1 | 9/2014 | Nickitas et al. | |
| 2014/0351078 A1 * | 11/2014 | Kaplan | G06Q 30/0631 705/26.7 |
| 2014/0358665 A1 | 12/2014 | Gopalsamy et al. | |
| 2015/0066674 A1 | 3/2015 | Liu et al. | |
| 2015/0332381 A1 * | 11/2015 | Wenger | G06Q 30/0633 705/26.81 |
| 2015/0363872 A1 | 12/2015 | Weinhold et al. | |
| 2016/0005070 A1 | 1/2016 | Burr et al. | |
| 2016/0071187 A1 | 3/2016 | Bhosle et al. | |
| 2016/0086239 A1 | 3/2016 | Musgrove et al. | |
| 2016/0190442 A1 * | 6/2016 | Fest | H01L 45/16 257/4 |
| 2017/0046692 A1 | 2/2017 | Borgmeyer | |
| 2017/0364991 A1 | 12/2017 | Noguchi | |
| 2018/0165740 A1 | 6/2018 | Jadhav et al. | |
| 2019/0354609 A1 | 11/2019 | Huang et al. | |

OTHER PUBLICATIONS

Arora, Raj, Bundling or unbundling frequently purchased products: a mixed method approach, The Journal of Consumer Marketing 28.1 (2011): 67-75, 13 pgs.

Wang et al., "Utilizing related products for post-purchase recommendation in e-commerce." In: Proceedings of the fifth ACM conference on Recommender systems. Oct. 27, 2011, retrieved from <http://citeseerx.ist.psu.edu/viewdoc/download?doi=10.1.1.471.4612&rep=1&type=pdf> entire document, 4 pgs.

ISA/US, International Search Report and Written Opinion issued on PCT/US2018/053455, dated Dec. 3, 2018, 13 pgs.

Canadian Intellectual Property Office, Office Action issued in Appl. No. 3,028,213, dated May 14, 2019, 4 pgs.

Canadian Intellectual Property Office, Office Action issued in Appl. No. 3,028,213, dated Jan. 7, 2020, 7 pgs.

United States Patent and Trademark Office, Non-Final Office Action issued in U.S. Appl. No. 16/143,723, dated Oct. 30, 2020, 27 pgs.

* cited by examiner

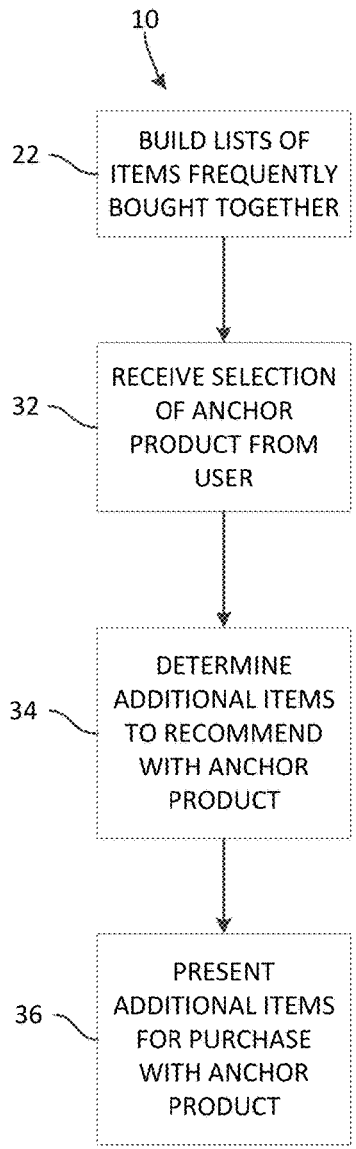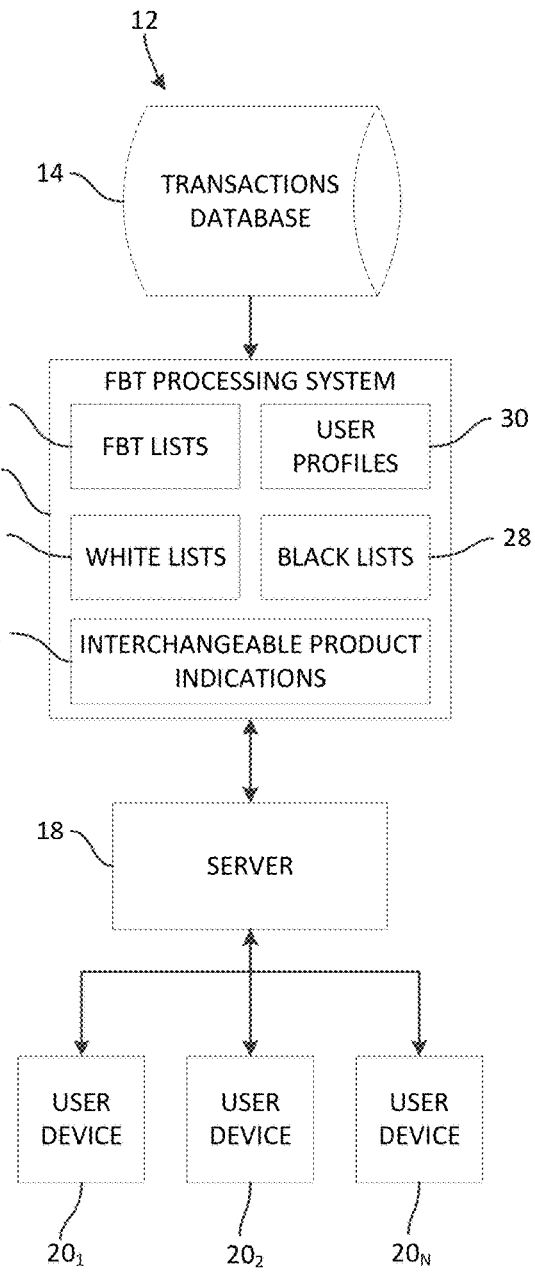
FIG. 1
FIG. 2

Anchor item: Product A
Selected Delivery Channel: STC
Anchor Item Cost: $100

| Additional Product | Delivery Channels | Available Inventory | Price | Black List? |
|---|---|---|---|---|
| B | STC, STS, ISP, DFS | STC, STS, ISP, DFS | $40 | No |
| C₁ | STC, STS | STC, STS | $5 | No |
| C₂ | STC, STS | STC, STS | $5 | No |
| D | STC, STS, ISP, DFS | ISP, DFS | $20 | No |
| E | STC, STS | STC, STS | $25 | Global |
| F | ISP, DFS | ISP, DFS | $15 | No |
| G | STC, STS, ISP, DFS | STC, STS | $200 | No |
| H | STC, STS | STC, STS | $10 | No |

STC = Ship to Customer
STS = Ship to Store
ISP = In-Store Pickup
DFS = Deliver From Store

PRODUCT RECOMMENDATIONS BASED ON ITEMS FREQUENTLY BOUGHT TOGETHER

FIELD OF THE DISCLOSURE

This disclosure is generally directed to providing product recommendations, including providing recommendations for products often purchased together.

BACKGROUND OF RELATED ART

Both a retailer and its customers can benefit from the retailer providing recommendations for products that may be of use to the customers. The retailer may provide product recommendations on a website, in a brick-and-mortar store, or otherwise. Recommendations may increase the retailer's sales, and may introduce useful or necessary products to the customer that the customer may otherwise not have found or been aware of.

Numerous websites and retailers provide product purchase recommendations. Many websites, however, provide product recommendations that are not as finely-tuned to the customer's needs as possible, or do not ideally account for past purchases. For example, the inventors of the instant disclosure have appreciated that many retailers provide product recommendations that are redundant or non-functional with each other, that do not appropriately account for the sales channel or delivery channel of the product recommendations, and/or do not properly account for multi-wise combinations of products that are frequently purchased together.

SUMMARY

An illustrative method of providing purchase recommendations to a user may include receiving, from a user, a selection of a product through an electronic user interface and determining a delivery channel for the product. The method may further include accessing a list of additional items available that are associated with the product as being frequently purchased with the product, determining that at least one of the additional items is available in the indicated delivery channel, and determining that at least one of the additional items is not available in the delivery channel. The method may further include presenting, on the electronic user interface, in response to the selection of the product from the user, the product and the at least one additional item that is available for delivery in the delivery channel. In an embodiment, the method may further include providing, on the electronic user interface, one or more graphical control elements with which the user is able to purchase the product and the presented at least one additional item.

An illustrative method of providing purchase recommendations to a user may include receiving, from a user, a selection of a product through an electronic user interface and accessing a list of additional items that are associated with the product as being frequently purchased with the product. The method may further include determining that at least two of the additional items are interchangeable with each other and selecting one of the at least two interchangeable additional items. The method may further include presenting, on the electronic user interface, in response to the selection of the product from the user, the selected one of the at least two interchangeable additional items and not the non-selected ones of the at least two interchangeable additional items. In an embodiment, the method may further include providing, on the electronic user interface, one or more graphical control elements with which the user is able to purchase the product and the selected one of the at least two interchangeable items.

An illustrative system for providing purchase recommendations to a user may include a computer-readable memory storing instructions and a processor. The processor may be configured to execute the instructions to receive, from a user, a selection of a product through an electronic user interface and determine a delivery channel for the product. The processor may further access a list of additional items that are associated with the product as being frequently purchased with the product, determine that at least one of the additional items is available in the indicated delivery channel, determine that at least one of the additional items is not available in the delivery channel, and present, on the electronic user interface, in response to the selection of the product from the user, the product and the at least one additional item that is available for delivery in the delivery channel. The processor may further provide, on the electronic user interface, one or more graphical control elements with which the user is able to purchase the product and the presented at least one additional item.

Providing purchase recommendations to a user according to the present disclosure may enable a user to more quickly purchase numerous items. For example, recommendations may be provided to a user along with an anchor product selected by the user, and the user may purchase both the selected product and the recommended items with a reduced number of clicks. In embodiments, graphical control elements may be provided that enable the user to select and purchase the anchor product and the recommended items from a single page or interface portion, thereby reducing user time and effort by eliminating the need for the user to separately navigate to the product page of each recommended item. As a result, providing product recommendations according to the techniques of the present disclosure solves an internet-centric problem—streamlining user interaction with a website or other electronic user interface—through methods and systems necessarily rooted in computer technology.

BRIEF DESCRIPTION OF THE DRAWINGS

FIG. 1 is a flow chart illustrating a method of providing product and other item purchase recommendations to a user, in embodiments.

FIG. 2 is a block diagram view of a system for providing product and other item purchase recommendations to a user, in embodiments.

FIG. 5 illustrates an example list of additional items that are frequently bought together with an anchor item.

DETAILED DESCRIPTION

Figure 3:
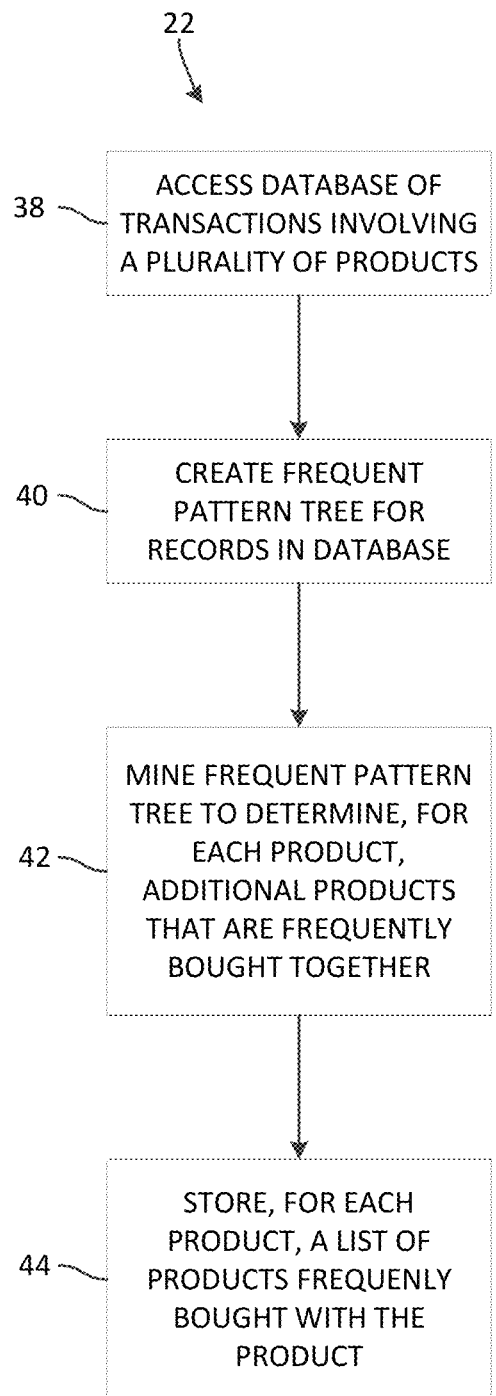
FIG. 3 is a flow chart illustrating a method of building lists of items that are frequently bought together, in embodiments.

The present disclosure includes systems and methods for providing product and other item purchase recommendations. The recommendations may be provided in conjunction with the viewing, selection, or purchase of a so-called "anchor product" or "anchor item" through an electronic user interface, such as one on an e-commerce website, a mobile application, a kiosk in a brick-and-mortar store, or elsewhere. Further, the recommendations may be provided by an in-store associate to a customer based on that customer's question about or interest in a product. Still further, recommendations may be provided on a digital price display (e.g., in a brick-and-mortar retail store) associated with the anchor product. The recommendations may include items, such as products, that are frequently purchased together with the anchor item. Recommendations may also include other items, such as equipment rentals or products that may be used to install or use the anchor item, services for installing or using the anchor item, or a warranty for the anchor item, for example. For the remainder of this disclosure, recommendations will generally be described as being provided on a website. Such disclosure is by way of example only. The same or similar functionality described herein as being provided on or through a website may also be provided through a mobile application, in-store kiosk, or otherwise.

First, with respect to FIGS. 1 and 2, an illustrative method and illustrative system for providing product recommendations will be described at a high level. With respect to FIG. 3, an illustrative method for building lists of frequently-bought-together items will be described. With respect to FIGS. 4 and 5, an illustrative method for filtering frequently-bought-together items will be described. With respect to FIGS. 6-14, various aspects of graphically presenting product recommendations and presenting location-based information associated with the product recommendations to the customer will be described. Finally, with respect to FIG. 15, an illustrative computing environment that may be used in conjunction with the methods and processes of this disclosure will be described.

Reference will now be made in detail to embodiments of the invention, examples of which are illustrated in the accompanying drawings. FIG. 1 is a flow chart of an illustrative method 10 for providing item purchase recommendations to a customer. FIG. 2 is a block diagram of an illustrative system 12 for providing item purchase recommendations to a user. The method 10 of FIG. 1 and the system 12 of FIG. 2 are described in conjunction below.

Generally, the method 10 may include receiving a selection of a product from a user and presenting recommended products or other items based on the user-selected product. A product selected by a user, with which recommendations may be provided according to the present disclosure, may be referred to as an "anchor product" or "anchor item." The item recommendations may include items that are frequently bought with the anchor product, services or equipment rentals that are useful with the anchor product, warranties for the anchor product, and the like.

The system 12 generally includes computer hardware and functional capability for carrying out the method and other methods and functions of this disclosure. The system 12 may include a transactions database 14, a Frequently Bought Together ("FBT") processing system 16, and a server 18 in electronic communication with a plurality of user devices $20_1, 20_2, \ldots 20_N$, which may be referred to individually as a user device 20 or collectively as user devices 20. The system 12 may also perform other methods of this disclosure and may provide one or more electronic user interfaces and/or graphical presentations of this disclosure. The system 12 may also host or otherwise provide one or more websites, mobile applications, and the like described in this disclosure, in embodiments.

The method 10 will be described in terms of a user, such as a customer, interacting with a website. The server 18 may host or provide that website, and accordingly may receive input from the user through the website. The server 18 may exchange information with the FBT processing system 16 to carry out one or more steps of the method, in embodiments. In other embodiments, the server 18 and the FBT processing system 16 may be the same processing system or apparatus.

The method 10 may be performed, in part or in full, by a retailer, in embodiments. That is, the system 12 may be owned or operated by or on behalf of a retailer, in embodiments. The method 10 may also be carried out, in full or in part, by some other type of entity. A website having the features referenced herein may be the website of a retailer, and the brick-and-mortar stores referenced herein may be stores of the same retailer. Additionally or alternatively, a website having the features described herein and the brick-and-mortar stores may be associated with different entities. A website having the features described herein may list and sell items sold by the retailer, in embodiments. Additionally or alternatively, such a website may list and sell items sold by third parties.

The method 10 may include a step 22 of building lists of items that are frequently bought together. An embodiment of the step 22 is illustrated in and will be described (as a method) in greater detail with respect to FIG. 3. With continued reference to FIGS. 1 and 2, the list building step 22 may generally include utilizing records of transactions in the transactions database 14 to determine which products are frequently bought together. The building step 22 may result in a set of lists of frequently-bought-together items (designated in FIG. 2 as "FBT lists" 24) stored in memory of the FBT processing system 16. In an embodiment, the FBT lists 24 may include one or more respective lists for each product with a recorded transaction in the transactions database 14, or some subset of those products. That is, each product may have its own FBT list(s) of items and/or combinations of items that are frequently bought with it.

The FBT processing system 16 may also store one or more white lists 26 of items that may be recommended regardless of whether or not they are frequently bought with other items, one or more black lists 28 of items for which the system may suppress recommendation to the user even if they are frequently bought with other items, one or more user profiles 30 that may be used to recommend products and services, and one or more indications of interchangeable products 31. The interchangeable product indications 31 may result from the building step 22 described below, in embodiments. The use of the white lists 26, black lists 28, user profiles 30, and interchangeable product indications 31 will be described in greater detail later in this disclosure.

With continued reference to FIGS. 1 and 2, the method 10 may further include a step 32 of receiving a selection of an anchor product from a user. The selection may be received, for example, by the FBT processing system 16 from a user device 20 through a website provided by the server 18 or through another electronic user interface such as a mobile application, in-store kiosk, etc. As noted above, the website may be, for example, an e-commerce site associated with or operated by or on behalf of a retailer. The selection may be, for example only, a click on the anchor product on a page of the website, navigation to a product information page of the anchor product on the website, a user action to add the anchor product to the user's shopping cart on the website, etc.

In an embodiment, a selection of an anchor product may be received from a user through a voice search or request through the electronic user interface. For example, the electronic user interface with which the user interacts may be on a mobile application, and the mobile application may be configured to capture voice search requests from the user. The server 18 or user device 20 may be configured with voice recognition software to parse the user's voice search or voice request to determine an anchor product. In response to the voice search or voice request, the server may provide a list of FBT recommendations to the user through the electronic user interface, as described below.

In another embodiment, a selection of an anchor product may be received from a user through a text-based (e.g., SMS or MMS) request. For example, the user may transmit a text message order for an anchor product from a user device 20 and, in response, the server 18 may transmit a list of FBT recommendations to the user device 20.

The method 10 may further include a step 34 of determining additional items to recommend to the user for purchase along with the anchor product. The determining step 34 may include two aspects, in an embodiment: selecting FBT items for presentment to the user and selecting other additional items for presentment to the user.

First, selecting FBT items for presentment to the user may include filtering a list of items that are frequently bought together with the anchor item, in an embodiment. The FBT processing system may access a list in the FBT lists 24 that is associated with the anchor item and filter the items on that list to create a set of additional FBT items to be recommended to the user. The filtering may account for entries associated with the anchor item on a black list associated with the item, may account for a user profile associated with the user, and/or other filtering criteria. An illustrative filtering method will be described in greater detail with respect to FIGS. 4 and 5. Second, selecting other additional items for presentment to the user may include, for example, selecting items off of a white list in the white lists 26 that is associated with the anchor product.

With continued reference to FIGS. 1 and 2, the method 10 may further include a step 36 of presenting the selected additional items for purchase with the anchor item. The additional items may be presented, for example, on the website adjacent to a listing of the anchor item. In embodiments, where the anchor item is selected by the user via the user's navigation to a product information page of the anchor item, the additional items may be presented on the anchor item's product information page. The additional items may be presented in conjunction with graphical control elements that enable the user to select the additional items and/or anchor item for purchase, singularly or in combination. The graphical control elements may enable the user to purchase the items by initiating a purchase (e.g., adding to cart) or by completing a purchase (e.g., checking out, performing a 1-click purchase, etc.), in embodiments. Various examples of presenting additional items to the user will be discussed with respect to FIGS. 6-14.

The method 10 advantageously provides product recommendations to customers on a website and allows the customers to purchase recommended products with a reduced number of clicks. Instead of separately selecting and separately navigating to a product information page of each of the recommended additional items, the method 10 provides a quicker way for the customer to purchase the anchor product and the additional items.

As will be detailed below, the presenting step 36 may include presenting a graphical display of additional items that are frequently bought together with the user-selected anchor product without additional website navigation by the user. For example, the additional products may be displayed on or over a product information page so that, from the product information page of the anchor product, the user can add the anchor product and one or more of the recommended additional items to the user's cart. In addition to, or instead of, providing the product recommendations on the product information page of the anchor product, product recommendations may be provided in a web page showing the user's cart, on a product search page, or otherwise.

The "user" noted in the method may be a customer that is shopping on a website provided by the server with a user device 20, in embodiments. The user device 20 may be a personal computer, user mobile computing device, or other computing device. Additionally or alternatively, the server 18 may provide all or part of an in-store checkout or informational environment or digital price display information, and the user devices 20 may be in-store kiosks or digital price displays.

FIG. 3 is a flow chart illustrating an embodiment of a method 22 for building lists of items that are frequently bought together. The method 22 may find use as the first step 22 in the method 10 of FIG. 1, in an embodiment. The method 22 may utilize the teachings of U.S. Pat. No. 6,665,669, which is hereby incorporated by reference, and Han et al., "Mining Frequent Patterns without Candidate Generation: A Frequent-Pattern Tree Approach," 8 Data Mining and Knowledge Discovery 53-87 (2004), which is also hereby incorporated by reference.

The method 22 may first include a step 38 of accessing a database of records of transactions involving a plurality of products. Referring to FIG. 2, the database may be the transactions database 14, for example. The transactions having records in the database may include any type of transactions. Although FIG. 3 indicates transactions involving a plurality of products, the transactions may also include services (e.g., installation services, construction services, repair services, etc.) and other items (e.g., equipment rentals, warranties, etc.). The transactions may be transactions from an e-commerce website, mobile application, from a brick-and-mortar store, from a catalog, made over the telephone, or through any other order channel.

Certain transactions stored in the database (e.g., the transactions database 14) may be excluded from consideration for building lists of items that are frequently bought together. For example, transactions for which one or more items are later returned may be excluded from consideration. In another example, transactions that include promotional sales may be excluded from consideration.

In embodiments, transactions that are technically separate may be considered the same transaction for purposes of determining whether items are frequently bought together. For example, two products purchased in two separate transactions that are close in time and location to each other may be considered to be purchased together. For example, a purchase of a product at a first register, and a rental of equipment to use that product at a second register in the same store by the same customer may be considered the same transaction for the purposes of determining how frequently the product and the equipment rental are purchased together. In another example, a purchase of a product at a first time, and a later purchase of a protection plan for the product at a later time may be considered the same transaction for the purposes of determining how frequently the product and the protection plan are purchased together. In yet another example, an in-store purchase of a first product and a later purchase by the same customer of a second product that was specially ordered for the customer, by the same customer, may be considered the same transaction for the purposes of determining how frequently the first product and the second product are purchased together.

The method 22 may further include a step 40 of creating a frequent pattern tree for the transactions records in the database. As detailed in the '669 patent, incorporated above, creating a frequent-pattern tree may include creating a list of the most frequently-purchased items in the database. For example, every item with more than a threshold number of records in the database may be added to the list.

This disclosure will make reference to a "support" or a "support score" for items. A support or support score for an item or combination of items may indicate the number of transactions that item or combination was involved in or the status of those transactions. In one embodiment, the support for an item may simply be the number of transactions in which that item is included in a selected set of data in the database. In some embodiments, the support score for an item may be calculated by weighting transactions. For example, an online purchase of an item may be weighted more heavily for support score calculation than in-store purchases, or vice-versa. In another example, a more recent transaction may be weighted more heavily than an older transaction. In embodiments, a support score may be calculated for each item represented in the transactions considered for building the frequent-pattern tree, and a threshold support score may be used (instead of or in addition to a raw number of transactions) to determine which items are included in the initial list of the most-frequently-purchased items in the database.

In an embodiment, the location of transactions may be weighted in calculating a support score. In such an embodiment, multiple FBT lists may be stored for a given product, each specific to a particular location or region, and each of those FBT lists may be based on support scores in which transactions within the particular location or region are weighted more heavily than transactions outside the particular location or region.

In embodiments, transaction records considered for building the frequent pattern tree may be selected from a particular time frame. For example, only transactions from a defined number of months or years may be used for creating the frequent pattern tree. The initial list of frequently purchased items may be developed into a full frequent pattern tree according to the disclosure of the '669 patent.

The method 22 may further include a step 42 of mining the frequent pattern tree to determine, for each product, a list of additional products that are frequently purchased together with that product. Details of mining the frequent pattern tree are disclosed in the '669 patent. An output of the mining process, in embodiments, may be a complete list of patterns (i.e., item combinations in transactions) that occur in the data more often than a defined threshold or that have a support score higher than a defined threshold. That threshold may be, in embodiments, the same threshold used to create the initial list of items for the frequent pattern tree. In other embodiments, a different threshold may be used.

The method 22 may further include a step 44 of storing, for each product, a list of items frequently bought together with that product. The list, when compiled, may reflect both pairwise relationships (e.g., how often is product A purchased with product B) and multi-wise relationships (e.g., how often is product A purchased with products B and C, or B and C and D, and so on). In embodiments, each product meeting the threshold for placement in the initial list of most frequently purchased items used to build the frequent pattern tree may have its own frequently bought together list(s), with the product on which each list is based serving as the "anchor product" or "anchor item" for that list. Each anchor product's FBT list may include a listing of the additional items (e.g., additional products, services, and other items) that are most frequently bought together with the anchor product. The listing may include a plurality of individual items that are frequently bought together with the anchor product and/or combinations of items that are frequently bought together with the anchor product. The listing may include, in embodiments, other products that are specifically useful with the product, services that are specifically useful with the product, and the like.

In embodiments, an FBT list may include interchangeable items that are similarly useful with the product or that are interchangeable with the anchor item itself. For example, an FBT list for a can of paint may include three different paint brushes. In embodiments, such interchangeable items may include multiple items from the same "Super-SKU," different versions of the same underlying product. Additionally or alternatively, interchangeable items may include items that are determined to be interchangeable based on a product taxonomy and/or based on semantic similarity. The method 22 may further include determining which products are interchangeable with each other, and storing indications of product interchangeability along with the FBT lists.

An FBT list may be capped at a defined number of additional items or combinations of additional items for each product, in embodiments. For example, the FBT list for a product may be capped at five (5), eight (8), or ten (10) additional items or combinations of items, for example. The cap may be set at any number as desired.

Information regarding the relationship between an anchor product and the items on its FBT list can be stored as part of or in addition to the FBT list, in embodiments. For example, a functional relationship between each additional item in an FBT list and the anchor item may be stored in the FBT list, in an embodiment. Additionally or alternatively, a compatibility score between each additional item and the anchor item may be stored, in an embodiment.

A support score is described above as calculated for an item with respect to a broad set of transactions, i.e., based on a set of transactions in a transactions database for a plurality of products. Additionally or alternatively, a support score may be calculated for an item with respect to a specific anchor product. The support score may reflect how often an anchor item's sales also include a given additional item and/or a status (e.g., online v. in-store or recency) of those sales. A support score may also be calculated and stored for a combination of items with respect to a specific anchor product (i.e., how often the anchor item's sales also include the combination). Such a combination of items may include different items, or a quantity of a single item (i.e., indicating how often two, three, or more of a single item are purchased with the anchor product). An anchor-item-specific support score may be calculated for one or more items in an FBT list and stored in conjunction with or in addition to the FBT list, in embodiments.

Referring again to FIGS. 1 and 2, the method/step 22 of building lists of items that are frequently bought together may result in a set of FBT lists 24 that are respectively specific to a plurality of anchor products, that each contain a list of items or combinations of items that are frequently bought together with a given anchor product. Each FBT list may include a number of items—e.g., up to five, or eight, or ten, or more items or combinations of items—that are frequently bought together with a given anchor product. FBT items for an anchor product may be presented to a customer upon customer selection of the anchor product. Additional items, such as from a white list for the anchor product, may also be presented. In presenting FBT items, in embodiments, it may be desirable to present the customer with less than the full FBT list for an anchor item. For example, while an FBT list may have five, eight, ten, or some other number of items or combinations of items, the set of additional items presented to the customer may include two or three FBT items, in embodiments. Accordingly, a step or method for filtering the list to present an appropriate number of appropriate items with an anchor product may be desired.

Figure 4:
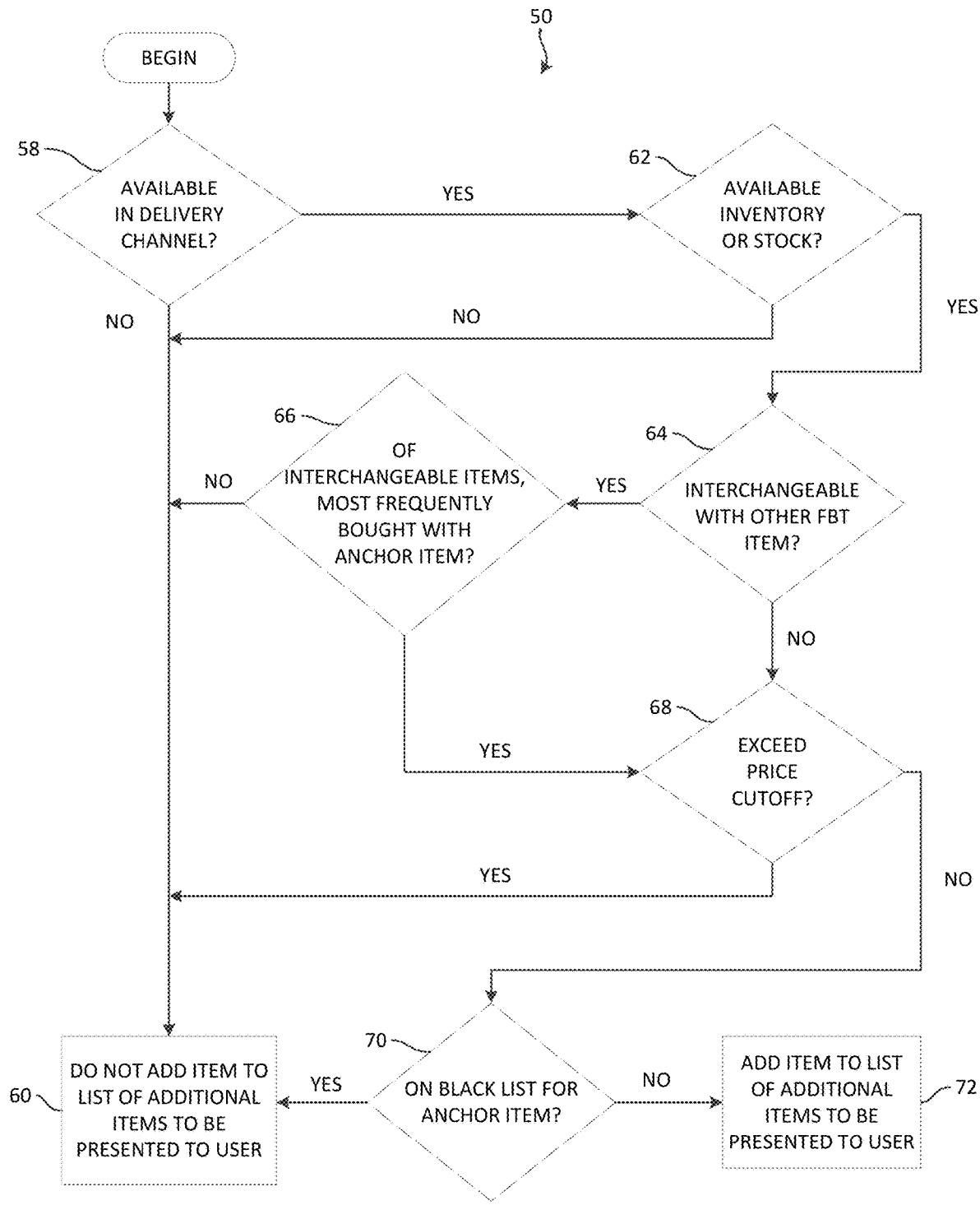
FIG. 4 is a flow chart illustrating a method of filtering frequently-bought-together items to determine which additional items to present to a user, in embodiments.

FIG. 4 is a flow chart illustrating an example method 50 of filtering a list of frequently bought together items. The method 50 may serve as an aspect of the determining step 34 in FIG. 1, in embodiments. Accordingly, the method 50 may be used to select FBT items from an FBT list for presentation to a customer. The method 50 may be applied to a single FBT list for a single product, in an embodiment. The method 50 may generally involve applying a number of filters to the FBT list to determine which items on the FBT list to present to the customer along with the anchor item.

FIG. 5 is an illustrative FBT list 52. The example FBT list 52 of FIG. 5 will be used to demonstrate the method 50 of FIG. 4. The example FBT list 52 is accompanied by information 54 regarding the anchor product, Product A, with a cost of $100, and a delivery channel of ship to customer ("STC"). The example FBT list 52 is further accompanied by a legend 56 indicating abbreviations used in the list 52.

Generally, the filtering method 50 may include applying a number of individual filters to the items on the FBT list 52. Example filters are represented in FIG. 4 as queries. The method 50 will be described, for ease of description, in terms of applying the example filters in a particular sequence to a single item at a time from an FBT list—first, Product B, then Product $C_1$, then Product $C_2$, and so on. Other sequences may be used, and/or some or all filters may be applied in parallel. Furthermore, the filters illustrated in FIG. 4 are examples only. Additional or alternative filters may be used, in embodiments.

Beginning with Product B, the method 50 may include a step 58 of determining whether or not the item is available in a delivery channel associated with the anchor item. A delivery channel may be associated with the anchor item, for example, through receipt of a user selection of a delivery channel along with the user selection of the anchor item, by determining one or more delivery channels of availability of the anchor item following user selection of the anchor item, or otherwise. In the example of FIG. 5, ship-to-customer is the delivery channel associated with the anchor product, Product A.

In embodiments, determining if an item on the FBT list 52 (an item on an FBT list may be referred to herein as an "FBT item") is available in the same delivery channel as the anchor item may include determining if the FBT item is available from the same source (e.g., the same warehouse or other physical location). In addition to determining if an FBT item is available in the same delivery channel as the anchor item, it may also be determined if the FBT item is available for delivery on the same day or within the same time frame as the anchor item. The specific source and delivery date of the anchor item and additional items is not illustrated in FIG. 5, but may be considered in other examples.

If it is determined that the additional item is not available in the same delivery channel as the anchor item, the method 50 may advance to a discarding step 60 of not adding the additional item to the list of additional items to be presented to the customer.

If, on the other hand, the additional item is available in the same delivery channel as the anchor item, like Product B, the method 50 may advance to a step 62 of determining whether the additional item has available inventory (for warehouse-based sales) or stock (for in-store sales). As shown in FIG. 5, Product B does have available inventory in the selected delivery channel, STC.

If the additional item does not have available inventory or stock, the method may advance to the discarding step 60. If the additional item does have available inventory or stock, like Product B, the method may advance to a step 64 of determining whether the additional item is interchangeable with any other item on the FBT list 52.

In the example of FIG. 5, interchangeability is indicated by subscripts. Thus, Product $C_1$ is interchangeable with Product $C_2$. In embodiments, interchangeability may be determined by product classification. Classifications may be in a hierarchical taxonomy, in embodiments. The taxonomy may be created and applied to products by the owner or operator of the website, in an embodiment. Accordingly, in embodiments, each item in each FBT list may be classified within the taxonomy. Though not illustrated in FIG. 5, the location in the taxonomy of each product in the FBT list 52 may be stored with or in addition to the FBT list 52, in embodiments. Two products may be considered equivalent, in an embodiment, if they are the same within the taxonomy at a given level of the taxonomy. That level may be selected by an operator of the method, in an embodiment.

In addition to or instead of a taxonomy-based interchangeability, two or more items may be determined to be interchangeable on a semantic basis. For example, product listings or descriptions may be parsed for two items, and a similarity of the listings or descriptions of the two may be used to determine if the items are interchangeable. Semantic information may reflect interchangeability that a taxonomy may not, in embodiments. For example, a multi-use tool may be interchangeable with a single-use tool with respect to the particular function of the single-use tool, but a taxonomy may not reflect that interchangeability. Referring to FIG. 1, the product taxonomy and/or semantic information may be stored in the interchangeable product indications 31, in an embodiment.

At step 64, if the additional item is interchangeable with at least one other item on the FBT list 52, the method 50 may advance to a step 66 of determining if, of those interchangeable items, the additional item is the most frequently bought with the anchor product. If the additional item is not the most frequently bought with the anchor item of those interchangeable items, the method may advance to the discarding step 60. Product B is not interchangeable with any other FBT item on the example FBT list of FIG. 5, so the method does not reach step 66 with respect to Product B.

Figure 11:
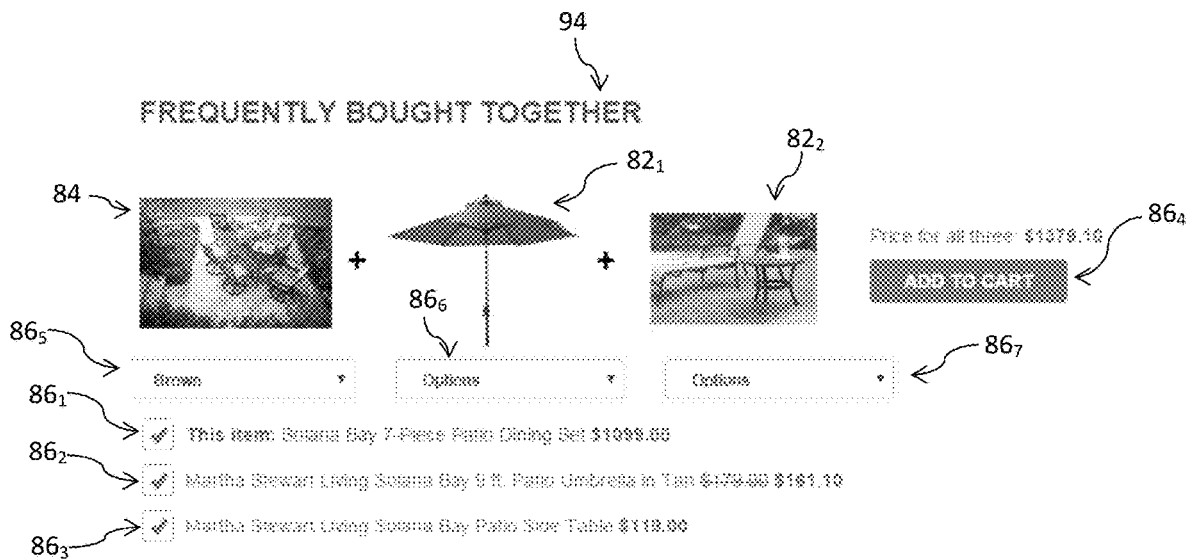
FIG. 11 illustrates a graphical presentation of frequently-bought-together item recommendations along with an anchor product, in embodiments.

Step 66 is described above with respect to a decision to present a single one of multiple interchangeable items to the user. As an alternative to that decision being made so that only a single one of multiple interchangeable items is presented to a consumer, the consumer may be provided with the option to select one of the multiple interchangeable items. For example, a drop-down menu may be provided to the user, as illustrated in FIG. 11 (menus $86_5$, $86_6$, $86_7$).

If the additional item is not interchangeable with any other items on the FBT list (at step 64) or is the most frequently purchased with the anchor product of those interchangeable items (at step 66), like Product B, the method 50 may advance to a step 68 of determining if the additional item exceeds a price cutoff. A price cutoff may be established, in embodiments, so that the additional items are not significantly more expensive than the anchor product and consequently viewed by the customer as up-selling. In embodiments, the price cutoff may be set as a percentage of the anchor item price. Additionally or alternatively, the price cutoff may be set as an absolute dollar amount. In the example of FIG. 5, the price cutoff may be set at a percentage of the price of Product A ($100). The cutoff price may be set, for example, at 50% more than the price of Product A, or $150. Product B, with a price of $40, does not exceed this price cutoff.

If the additional item exceeds the price cutoff, the method 50 may advance to the discarding step 60. If the additional item does not exceed the price cutoff, like Product B, the method 50 may advance to a step 70 of determining if the additional item is on a black list associated with the anchor item or on a global black list. Product B is not on any black list.

As noted above, a black list may be established for each possible anchor product that lists certain additional items that should not be presented to the user for purchase with the anchor item even if those additional items are frequently purchases with the anchor item. For example, in an embodiment, commodity items that may be purchased from the front lanes of a brick-and-mortar store, and thus may be frequently bought with many anchor products despite having no functional connection to those anchor products, may be on the black list for one or more products. For example, beverages and batteries may be considered commodity items in embodiments, and correspondingly black listed. A black list for an anchor item may further include items that, if used with the anchor item, would void the warranty for either the anchor item or for the additional item. A black list for an anchor item may further include items that are often bought with the anchor item but that are not actually functional with the anchor item—e.g., an installation tool for an anchor item that is intended for installing another product, an adhesive that is not functional with the material of the anchor item, and so on.

A black list may be specific to a particular product, in embodiments. Accordingly, each product having its own FBT list may also have its own black list (if any items are desired to be black-listed for that product). In embodiments, what may be considered a commodity item with respect to one product, and thus may be on that product's black list, may not be considered a commodity item for another product. For example, batteries may be considered a commodity item when the anchor product is a hammer, but may not be considered a commodity item when the anchor product is a flashlight.

In addition to a black list specific to each anchor product, a global black list may be stored (e.g., in the black lists 28 of FIG. 1) and used (e.g., in conjunction with a product-specific black list) in the black list filtering step 70. A global black list may include, for example, discontinued products, live goods (e.g., plants), commodity items (e.g., batteries), foodstuffs or other checkout-aisle goods (such as soft drinks, for example), and other items for which recommendations to customers may not be desired. In addition to anchor-product specific and global black lists, black lists may also be established for product classifications or other item groupings.

If the additional item is on the black list for the anchor product, the method may advance to the discarding step 60. If the additional item is not on the black list for the anchor product, like Product B, the method may advance to a step 72 of adding the item to a list of additional items to be presented to the customer, thereby selecting the item for presentment to the user that selected Product A.

The method 50 may be executed repeatedly, for numerous items in an FBT list, numerous items in a combination on an FBT list, and/or for numerous combinations of items on an FBT list until a desired number of additional items is selected for recommendation and presentation to the customer at the adding step 72, in an embodiment. The desired number of items may be defined in advance. For example, two, three, or four additional items may be desired, in embodiments. The desired number of items may be defined in terms of a total cost (e.g., sale price) of the items, in an embodiment. For example, the desired number of items may be enough items (taking each item's sale price into account) for a customer to acquire free shipping on an order if all recommended items are purchased along with the anchor item, in an embodiment. Iterations of the method 50 may begin with the item in the FBT list that is most frequently bought with the anchor item (Product B, in the example of FIG. 5), in an embodiment. The next iteration may advance to the second-most-frequently bought item (Product $C_1$ in the example of FIG. 5), and so on.

Thus, in the example of FIG. 5, if three FBT item recommendations are desired (with Product B having been selected as the first), the method may next be executed with respect to the next FBT item, Product $C_1$.

Product $C_1$ is available in the STC delivery channel and has inventory in the STC delivery channel, as shown in FIG. 5. Accordingly, the method may progress through steps 58 and 62. At step 64, because Product $C_1$ is interchangeable with Product $C_2$, the method 50 advances to step 66. At step 66, it may be determined that Product $C_1$ is purchased with Product A more frequently than is Product $C_2$. As a result, the method proceeds to step 68. Product $C_1$ does not exceed the price cutoff and is not on a black list. Accordingly, the method with respect to Product $C_1$ advances to step 72, and Product $C_1$ is thereby selected to be presented to the customer.

In the example of FIG. 5, further iterations of the method may be executed with respect to Products $C_2$, D, E, F, G, and H. Product $C_2$ may be discarded after step 66, as it is interchangeable with product $C_1$, but Product $C_1$ is purchased more often with anchor Product A. Product D may be discarded after step 62 because it does not have inventory for the STC delivery channel. Product E may be discarded after step 70 because it is on a global black list. Product F may be discarded after step 58 because it is not available in the STC delivery channel. Product G may be discarded after step 68 because it exceeds the price threshold. Finally, Product H will be selected for presentment to the customer, because Product H passes all filters embodied in the method 50. Accordingly, by executing the method in succession on the example FBT list of FIG. 5, Products B, $C_1$, and H may be selected for presentment. It should be noted that, had application of the method to the example list selected a third item for presentment before the end of the list, the method may not have been applied to each item on the list.

As a result of the application of the method 50 to an FBT list associated with an anchor item, a list of additional items that are frequently purchased with the anchor item may be compiled for presentation to the user (Products B, $C_1$, and H, in the example of FIG. 5). In embodiments, each of the items on the compiled list may have inventory or stock available in the same delivery channel as the anchor item, may not exceed a cutoff price, and may not be blacklisted. Furthermore, the method 50 may prevent (by virtue of steps 64 and 66) multiple interchangeable items from being recommended to the user at the same time. In the example of FIG. 5, the method 50 prevented the simultaneous presentation of Products $C_1$ and $C_2$ by suppressing the selection of Product $C_2$.

In addition to or instead of one or more of the filters expressed in the flow chart of FIG. 4, other filters may be applied in other embodiments of the method 50. For example, products that are interchangeable with the anchor product may be filtered out, in embodiments. FBT products may also be filtered based on a user profile associated with the user, in embodiments. The user profile (e.g., stored in the user profiles 30 of FIG. 1) may indicate, for example, a level of skill or experience of the user (e.g., professional or non-professional, such as a "DIYer"), a purchase history of the user, or other information respective of the user. The user's profile may be compiled based on profile information provided by the user (e.g., on or through the website), based on the user's browsing history (generally, as through cookie tracking and the like, or specifically on the website, through server-side tracking, for example), based on the user's current shopping cart, etc.

As a result of user profile-based filtering, FBT items may be recommended to a user that match the user's level of skill or experience. For example, an FBT list may include two interchangeable products, one of higher cost, durability, or complexity, and another of lower cost, durability, or complexity. Based on user profile filtering, the higher-cost, higher-durability, or higher-complexity item may be recommended to a professional user, and the other item may be recommended to a non-professional user.

The application of the method 50 of FIG. 4 to the example FBT list 62 of FIG. 5 is described above with respect to pairwise item combinations—i.e., Product A with Product B, Product A with Product $C_1$, and so on. But as noted above, one advantage of building an FBT list with a frequent pattern tree is that multi-combinations, rather than just pairwise combinations, may be considered. As a result, in embodiments, an FBT list may include, instead of or in addition to single items (as in the example of FIG. 5), combinations of items that are frequently bought with the anchor product. In such an embodiment, filtering the list to select FBT items for presentation to the customer may result in selecting the FBT combination that is most frequently purchased with the anchor item and in which each item in the combination passes all of the filters (e.g., is available in a delivery channel of the anchor item, does not exceed a price threshold, etc.).

Referring again to FIG. 1, as noted above, the second aspect of the step 34 of determining or selecting products for presentation to the user is selection of non-FBT items. For example, a white list of additional items may be maintained for one or more products having an FBT list. In an embodiment, each product having an FBT list in the FBT lists may also have a white list in the white lists 26 (see FIG. 2).

A white list may include one or more items that a retailer wishes to offer in conjunction with the anchor item, in an embodiment. For example, a white list may include a warranty for the anchor item, a product required to install the anchor item, and the like, a rental for equipment that can be used to install the anchor item, services for installing or servicing the anchor item, and the like. One or more items from a white list associated with the anchor product or a category of the anchor product may be selected for presentation to the user along with the FBT items selected for presentation to the user.

Figure 6:
FIG. 6 illustrates a graphical presentation of frequently-bought-together item recommendations along with an anchor product, in embodiments.

Referring to FIG. 1, once a set of additional items is compiled for presentment to the customer—including FBT items and other any other desired items, such as white list items—the additional items may be presented to the user at step 36. FIG. 6 illustrates an example of a graphical presentation 80 of additional items $82_1$, $82_2$ along with an anchor item 84. In the example of FIG. 6, the anchor item 84 is a toilet. The additional items $82_1$, $82_2$ presented to the user are a toilet connector and a wax ring. In the example, both additional items $82_1$, $82_2$ were from the FBT list associated with the toilet. The graphical presentation 80 may be provided on a product information page for the toilet, for example.

One or more graphical control elements 86 may be provided in conjunction with the additional items and/or the anchor product to enable the customer to quickly select the additional items and/or the anchor product to purchase or add to cart the additional items and/or the anchor product. The graphical control elements may be or may include radio buttons, check boxes, drop-down menus, or any other appropriate graphical control element, in embodiments. In the example of FIG. 6, the graphical control elements are check boxes $86_1$, $86_2$, $86_3$ and an "ADD TO CART" button $86_4$ that permit individual selection of the anchor product and any of the additional items and addition of the selected items to cart.

Referring to FIGS. 2 and 6, the server 18 may provide the graphical presentation 80 as part of a website in response to a selection of the anchor item (the toilet). The server 18 may receive a selection of one or more of the additional items $82_1$, $82_2$ and/or the anchor product 84 and may add the selected items to the user's cart responsive to the user's use of the check boxes $86_1$, $86_2$, $86_3$ and selection of the "ADD TO CART" button $86_4$.

Figure 7:
FIG. 7 illustrates a graphical presentation of frequently-bought-together item recommendations along with an anchor product, in embodiments.

As shown in FIG. 6, information 88 about each of the additional items may be provided as part of presenting the additional items $82_1$, $82_2$ to the customer, in an embodiment. Additionally or alternatively, information about the relationship between the anchor item and each additional item may be provided, in embodiments. FIG. 7 illustrates the example graphical presentation 80 of FIG. 6, with additional information provided for the additional items and the anchor item. In FIG. 7, a functional relationship 90 between the anchor product and the additional items is given by functional relationship indicators "Toilet," "Toilet Connector," and "Toilet Wax Ring."

In other embodiments, in addition to or instead of the functional relationship indicators, compatibility scores may be provided (indicating a compatibility in terms of a percentage, for example, between the anchor item and each additional item). Additionally or alternatively, a support score for each additional item may be provided. The support score may be with respect to the anchor item, in an embodiment, or with respect to the entire set of transactions used to build the FBT lists, in another.

Figure 8:
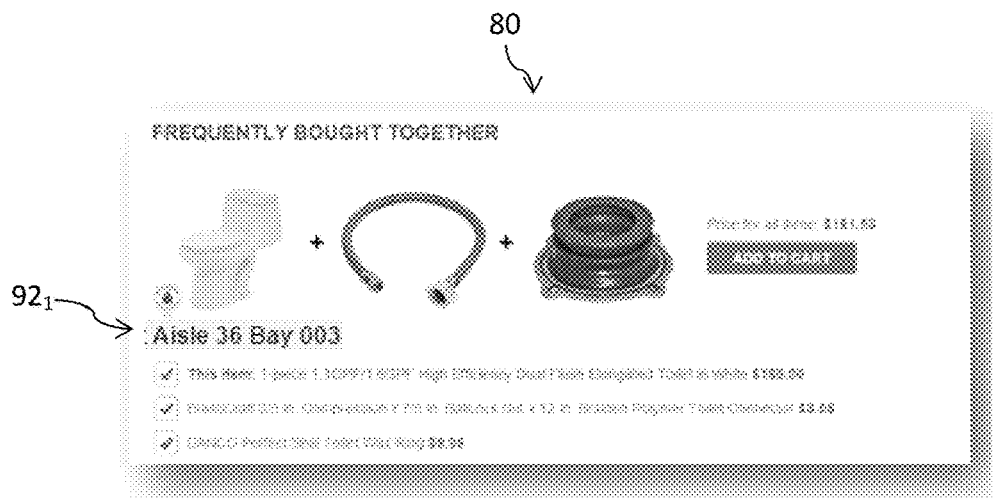
FIG. 8 illustrates a graphical presentation of frequently-bought-together item recommendations along with an anchor product, in embodiments.
Figure 9:
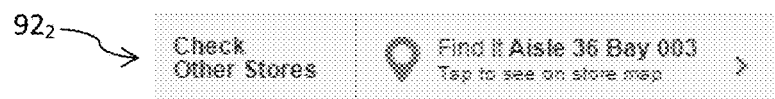
FIG. 9 illustrates a graphical presentation of a link to a map to an in-store product recommendation, in embodiments.
Figure 10:
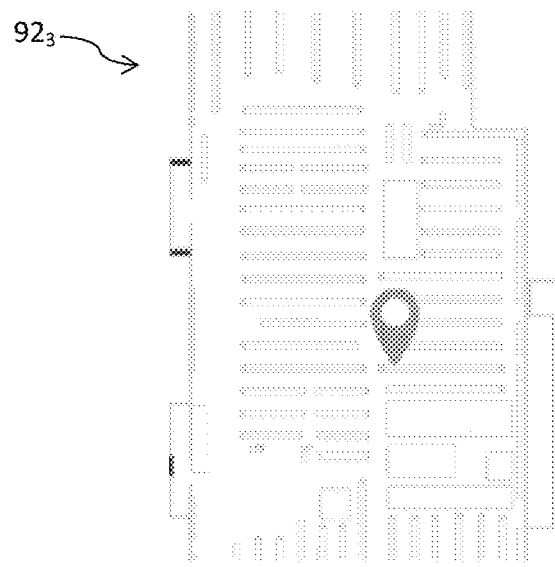
FIG. 10 illustrates a map to an in-store product recommendation, in embodiments.

As noted above, one consideration in providing additional item recommendations to the user is whether the additional items are available in the same delivery channel as the anchor item. One possible delivery channel is "in-store pickup," in which the customer reserves the product through an online order and goes to a specified brick-and-mortar store to pick up the product. For such an order, additional items recommended may also be available for pickup in the same store. For such items, a physical location in the store for each item may be provided. FIG. 8 illustrates an example of such information being provided along with the example product purchase of FIG. 6. An in-store location indication $92_1$ may include, for example, an aisle and bay, as shown in FIG. 8. Additionally or alternatively, an in-store location indication $92_2$ may include, for example, a link to a map illustrating an in-store location, as shown in FIG. 9. Additionally or alternatively, an in-store location indication $92_3$ may include a map of the in-store location, as shown in FIG. 10. Still further, a route through the store to one or more recommended items may be provided on a map, such as on the map of FIG. 10.

FIG. 11 illustrates another example of a graphical presentation 94 of additional items along with an anchor item. In the example of FIG. 11, the anchor item 84 is a patio dining set, and the additional items $82_1$, $82_2$ are an umbrella and a patio side table. The graphical presentation 94 of FIG. 11 includes additional and alternative graphical control elements for selecting and adding the anchor product and additional items to cart. As shown in FIG. 11, the graphical presentation may include drop-down menus $86_5$, $86_6$, $86_7$ with which the user can select from different available options (e.g., colors, sizes, etc.) of the anchor item 84 and/or the additional items $82_1$, $82_2$, as well as check boxes $86_1$, $86_2$, $86_3$ with which the user can elect the anchor item and/or the additional items for addition to the user's cart with the "ADD TO CART" button $86_4$.

Figure 12:
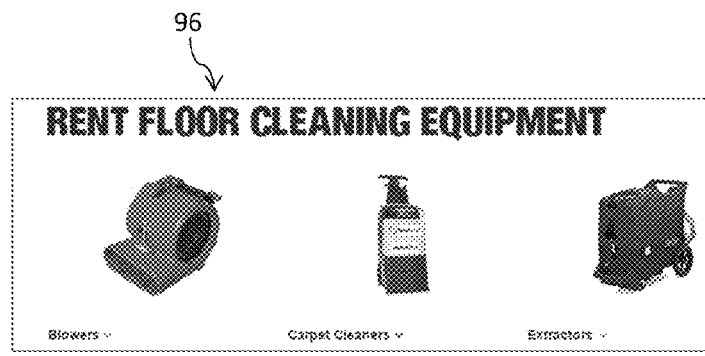
FIG. 12 illustrates a graphical presentation of equipment rental recommendations, in embodiments.

As noted above, in addition to or instead of products, additional item recommendations may include, for example, equipment rentals and/or a warranty for the anchor product. FIG. 12 illustrates an example graphical presentation 96 of equipment rentals. Such rental recommendations may be displayed separately from the FBT additional items, as illustrated in FIG. 12. Alternatively, rental recommendations may be provided in the same graphical presentation as FBT items (e.g., as in the presentations of FIG. 6 or 11.)

Figure 13:
FIG. 13 illustrates a graphical presentation of a warranty recommendation, in embodiments.

FIG. 13 illustrates a graphical presentation 98 of a warranty associated with an anchor product. Such warranty recommendations may be displayed separately from the FBT additional items, as illustrated in FIG. 13. Alternatively, warranty recommendations may be provided in the same graphical presentation as FBT items (e.g., as in the presentations of FIG. 6 or 11). A warranty may be recommended based on the price of the anchor item, in embodiments.

Figure 14:
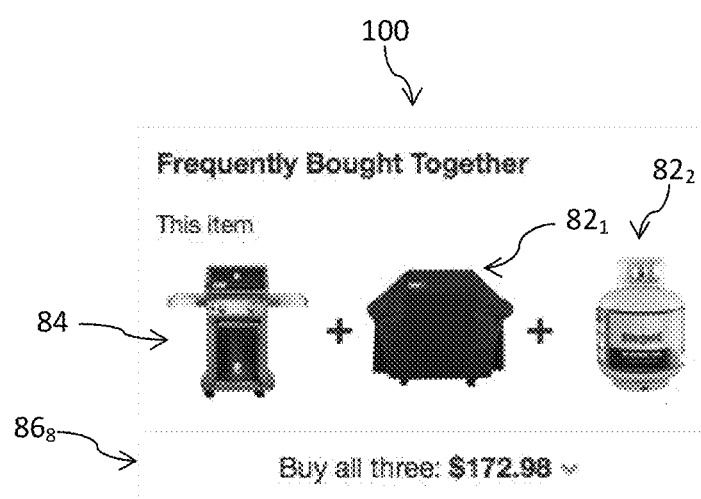
FIG. 14 illustrates a graphical presentation of frequently-bought-together item recommendations along with an anchor product, in embodiments.

FIG. 14 illustrates another example of a graphical display 100 of additional items $82_1$, $82_2$ (a grill cover and a propane tank) along with an anchor item 84 (a grill). In the graphical display of FIG. 14, a single graphical control element is provided—a drop down menu $86_8$ that provides different combinations of the anchor product and the additional items for addition to the user's cart.

Figure 15:
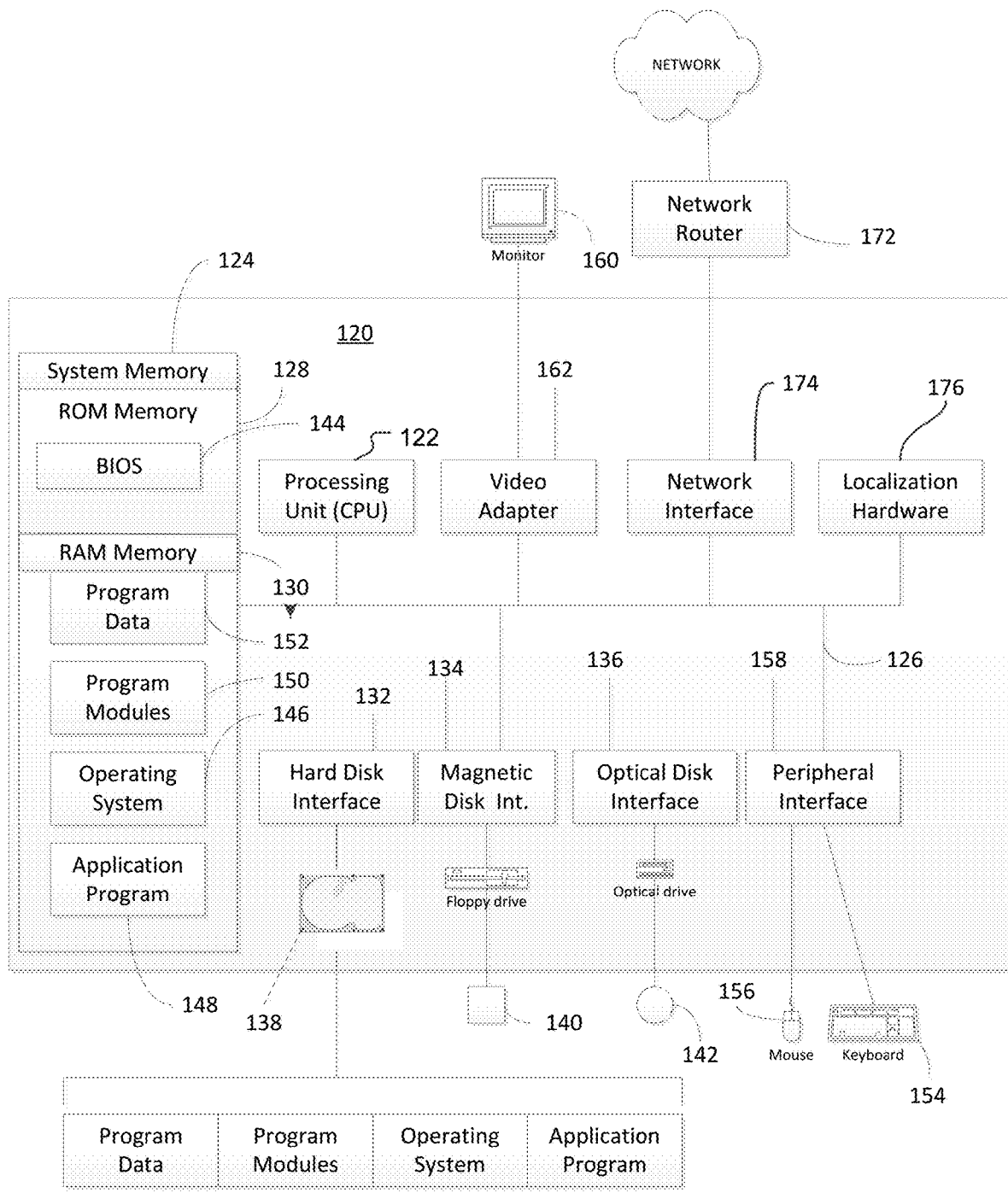
FIG. 15 is a diagrammatic view of a user computing environment, according to some embodiments.

FIG. 15 is a diagrammatic view of an illustrative computing system that includes a general purpose computing system environment 120, such as a desktop computer, laptop, smartphone, tablet, or any other such device having the ability to execute instructions, such as those stored within a non-transient, computer-readable medium. Furthermore, while described and illustrated in the context of a single computing system 120, those skilled in the art will also appreciate that the various tasks described hereinafter may be practiced in a distributed environment having multiple computing systems 120 linked via a local or wide-area network in which the executable instructions may be associated with and/or executed by one or more of multiple computing systems 120.

In its most basic configuration, computing system environment 120 typically includes at least one processing unit 122 and at least one memory 124, which may be linked via a bus 126. Depending on the exact configuration and type of computing system environment, memory 124 may be volatile (such as RAM 130), non-volatile (such as ROM 128, flash memory, etc.) or some combination of the two. Computing system environment 120 may have additional features and/or functionality. For example, computing system environment 120 may also include additional storage (removable and/or non-removable) including, but not limited to, magnetic or optical disks, tape drives and/or flash drives. Such additional memory devices may be made accessible to the computing system environment 120 by means of, for example, a hard disk drive interface 132, a magnetic disk drive interface 134, and/or an optical disk drive interface 136. As will be understood, these devices, which would be linked to the system bus 126, respectively, allow for reading from and writing to a hard disk 138, reading from or writing to a removable magnetic disk 140, and/or for reading from or writing to a removable optical disk 142, such as a CD/DVD ROM or other optical media. The drive interfaces and their associated computer-readable media allow for the nonvolatile storage of computer readable instructions, data structures, program modules and other data for the computing system environment 120. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 120.

A number of program modules may be stored in one or more of the memory/media devices. For example, a basic input/output system (BIOS) 144, containing the basic routines that help to transfer information between elements within the computing system environment 120, such as during start-up, may be stored in ROM 128. Similarly, RAM 130, hard drive 138, and/or peripheral memory devices may be used to store computer executable instructions comprising an operating system 146, one or more applications programs 148 (such as a Web browser, retailer's mobile app, retailer's point-of-sale checkout and ordering program, and/or other applications that execute the methods and processes of this disclosure), other program modules 150, and/or program data 152. Still further, computer-executable instructions may be downloaded to the computing environment 120 as needed, for example, via a network connection.

An end-user, e.g., a customer, retail associate, and the like, may enter commands and information into the computing system environment 120 through input devices such as a keyboard 154 and/or a pointing device 156. While not illustrated, other input devices may include a microphone, a joystick, a game pad, a scanner, etc. These and other input devices would typically be connected to the processing unit 122 by means of a peripheral interface 158 which, in turn, would be coupled to bus 126. Input devices may be directly or indirectly connected to processor 122 via interfaces such as, for example, a parallel port, game port, firewire, or a universal serial bus (USB). To view information from the computing system environment 120, a monitor 160 or other type of display device may also be connected to bus 26 via an interface, such as via video adapter 162. In addition to the monitor 160, the computing system environment 120 may also include other peripheral output devices, not shown, such as speakers and printers.

The computing system environment 120 may also utilize logical connections to one or more computing system environments. Communications between the computing system environment 120 and the remote computing system environment may be exchanged via a further processing device, such a network router 172, that is responsible for network routing. Communications with the network router 172 may be performed via a network interface component 174. Thus, within such a networked environment, e.g., the Internet, World Wide Web, LAN, or other like type of wired or wireless network, it will be appreciated that program modules depicted relative to the computing system environment 120, or portions thereof, may be stored in the memory storage device(s) of the computing system environment 120.

The computing system environment 120 may also include localization hardware 176 for determining a location of the computing system environment 120. In embodiments, the localization hardware 176 may include, for example only, a GPS antenna, an RFID chip or reader, a WiFi antenna, or other computing hardware that may be used to capture or transmit signals that may be used to determine the location of the computing system environment 120.

While this disclosure has described certain embodiments, it will be understood that the claims are not intended to be limited to these embodiments except as explicitly recited in the claims. On the contrary, the instant disclosure is intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various embodiments of the present invention.

It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A method of providing purchase recommendations to a user, comprising:
   receiving, from a user, a selection of a product through an electronic user interface;
   determining a delivery channel that is available for the selected product based on information stored in association with the selected product, the determined delivery channel selected from two or more delivery channels, wherein a given delivery channel is associated with a unique pair of source location and destination;
   retrieving, from a storage device, a list of additional items that are associated with the product as being frequently purchased with the product, each additional item being associated with a respective one or more available delivery channels;
   determining, by a processor, that at least a first one of the additional items is available in the delivery channel of the selected product based on the first at least one additional item being associated with the delivery channel of the selected product;
   determining, by the processor, that at least a second one of the additional items is not available in the delivery channel of the selected product based on the second at least one additional item not being associated with the delivery channel of the selected product; and
   presenting, on the electronic user interface, in response to the selection of the product from the user, the selected product and the first at least one additional item that is available for delivery in the delivery channel of the selected product.

2. The method of claim 1, further comprising providing, on the electronic user interface, one or more graphical control elements with which the user is able to purchase the product and the presented at least one additional item, whereby the user is able to purchase the product and the presented at least one additional item with a reduced number of clicks.

3. The method of claim 2, further comprising:
receiving a selection of one or more of the graphical control elements from the user; and
adding the additional items associated with the selected one or more graphical control elements to the user's cart in response to the received selection.

4. The method of claim 1, wherein the delivery channel is selected from the list consisting of:
ship-to-customer;
ship-to-store;
deliver from store; or
in-store pickup.

5. The method of claim 1, wherein the list of additional items comprises a plurality of combinations of items that are frequently purchased with the product.

6. The method of claim 1, further comprising:
suppressing presentation of one of the additional items that would void the warranty on the first item if combined with the first item;
suppressing presentation of one of the additional items that is not functional with the first item; or
suppressing presentation of one of the additional items that is a commodity item.

7. The method of claim 1, further comprising determining if the at least one additional item available in the delivery channel has inventory available for provision in the delivery channel.

8. The method of claim 1, further comprising:
creating a frequent pattern tree for a database of records of transactions, the transactions comprising purchases of the product and the additional items;
mining the frequent pattern tree to determine the set of additional items that are frequently purchased with the product in the transactions; and
storing the set of additional items in a computerized storage device.

9. The method of claim 8, wherein the records of transactions comprise records of purchases through a website or mobile application and records of purchases in one or more brick-and-mortar stores.

10. The method of claim 8, wherein creating a frequent pattern tree for the database of records of transactions comprises one or more of:
excluding transactions in which one or more items were later returned; or
excluding transactions in which one or more items were purchased on promotion.

11. The method of claim 8, wherein determining the set of additional items that are frequently purchased with the product in the transactions comprises one or more of:
weighting transactions according to location;
weighting transactions according to sales channel; or
determining a frequency with which a combination of the additional items is purchased with the product.

12. The method of claim 8, wherein:
determining the set of additional items that are frequently purchased with the product in the transactions comprises determining a frequency with which a quantity of two or more of one of the additional items is purchased with the product;
storing the set of additional items comprises storing an indication of the quantity;
the at least one additional item that is available for delivery in the delivery channel is the one of the additional items for which a quantity is determined; and
presenting the product and the at least one additional item that is available for delivery in the delivery channel comprises presenting the quantity.

13. The method of claim 1, further comprising:
presenting, on the electronic user interface, along with the product and the at least one additional item that is available in the delivery channel, a further additional item that may be used to install the product, but is not included in the list of additional items that are associated with the product as being frequently purchased with the product.

14. The method of claim 1, wherein the delivery channel is in-store pickup, the method further comprising presenting, along with the at least one additional item that is available in the delivery channel, at least one of:
a location in a store where the one or more additional items are located;
a map of a location in a store where the one or more additional items are located; or
a route to a location in a store where the one or more additional items are located.

15. The method of claim 1, further comprising presenting, along with the product and the at least one additional item that is available in the delivery channel, one or more of:
an installation service associated with the product;
an equipment rental associated with the product; or
a warranty associated with the product.

16. The method of claim 1, further comprising presenting, along with the product and the at least one additional item that is available in the delivery channel, one or more of:
information indicative of the frequency with which the product and the at least one additional item are purchased together;
information indicative of a compatibility between the product and the at least one additional item; or
information indicative of a functional relationship between the product and the at least one additional item.

17. The method of claim 1, further comprising:
determining a delivery date for the product;
determining that at least one of the additional items that is available in the delivery channel is also available for delivery on the delivery date; and
presenting, in the electronic user interface, in response to the selection of the product from the user, the product and the at least one additional item that is available for delivery in the delivery channel on the delivery date.

18. A system for providing purchase recommendations to a user, comprising:
a computer-readable memory storing instructions; and a processor configured to execute the instructions to:
receive, from a user, a selection of a product through an electronic user interface;
determine a delivery channel that is available for the selected product based on information stored in the computer-readable memory in association with the selected product, the determined delivery channel selected from two or more delivery channels, wherein a given delivery channel is associated with a unique pair of source location and destination;

retrieve a list of additional items stored in the computer-readable memory that are associated with the product as being frequently purchased with the product, each additional item being associated with one or more delivery channels;

determine, by the processor, that at least a first one of the additional items is available in the indicated delivery channel of the selected product based on the first at least one additional item being associated with the delivery channel of the selected product;

determine, by the processor, that at least a second one of the additional items is not available in the delivery channel of the selected product based on the second at least one additional item not being associated with the delivery channel of the selected product; and present, on the electronic user interface, in response to the selection of the product from the user, the selected product and the first at least one additional item that is available for delivery in the delivery channel of the selected product.

19. The system of claim 18, wherein the processor is configured to execute the instructions further to provide, on the electronic user interface, one or more graphical control elements with which the user is able to purchase the product and the presented at least one additional item, whereby the user is able to purchase the product and the presented at least one additional item with a reduced number of clicks.

20. The system of claim 19, wherein the processor is configured to execute the instructions further to:
   receive a selection of one or more of the graphical control elements from the user; and
   add the additional items associated with the selected one or more graphical control elements to the user's cart in response to the received selection.

\* \* \* \* \*